United States Patent [19]
Ishinaga

[11] Patent Number: 5,938,312
[45] Date of Patent: Aug. 17, 1999

[54] SURFACE MOUNTING TYPE LIGHT EMITTING DISPLAY DEVICE, PROCESS FOR MAKING THE SAME, AND SURFACE MOUNTING STRUCTURE OF THE SAME

[75] Inventor: Hiroki Ishinaga, Kyoto, Japan

[73] Assignee: Rohm Co., Ltd., Kyoto, Japan

[21] Appl. No.: 08/717,878

[22] Filed: Sep. 23, 1996

[30] Foreign Application Priority Data

Sep. 22, 1995 [JP] Japan .................................. 7-244996
Nov. 24, 1995 [JP] Japan .................................. 7-305311

[51] Int. Cl.⁶ .................................................. G01D 11/28

[52] U.S. Cl. ........................ 362/29; 362/236; 362/800; 362/237; 362/240

[58] Field of Search ................................. 362/31, 26, 27, 362/28, 29, 30, 235, 800, 236, 237, 249

[56] References Cited

U.S. PATENT DOCUMENTS

| | | | |
|---|---|---|---|
| 5,467,208 | 11/1995 | Kokawa et al. | 359/49 |
| 5,475,939 | 12/1995 | Salam | 40/449 |
| 5,648,858 | 7/1997 | Shibata et al. | 362/31 |

*Primary Examiner*—Thomas M. Sember
*Attorney, Agent, or Firm*—Michael D. Bednarek; Crowell & Moring LLP

[57] ABSTRACT

A surface mounting type light emitting display device is provided which includes a base plate and a case member. The base plate is formed with terminal electrodes at least along one edge thereof and carries light emitting elements thereon. The case member is provided for covering and accommodating the light emitting elements. The display device further includes a mounting device for attaching the case member to the base plate while allowing the case member and the base member to expand and contract independently of each other at least in one direction.

15 Claims, 8 Drawing Sheets

SURFACE MOUNTING TYPE LIGHT EMITTING DISPLAY DEVICE, PROCESS FOR MAKING THE SAME, AND SURFACE MOUNTING STRUCTURE OF THE SAME

BACKGROUND OF THE INVENTION

1. Field of the Invention

The present invention relates to a surface mounting type light emitting display device. The present invention also relates a process for making such a display device, and a surface mounting structure incorporating the same.

2. Description of the Related Art

Light emitting display devices are widely used for representing figures, characters, signs and the like in electric equipments such as portable telecommunication devices and audio-visual apparatuses. A typical example of light emitting display device is a lead mounting type light emitting display device, as shown in FIGS. 11a and 11b of the accompanying drawings.

Specifically, the lead mounting type light emitting display device shown in FIGS. 11a and 11b comprises a case member 22 having a plurality of segmented display windows 21 in a predetermined arrangement (figure eight for example), and a circuit board 24 housed in the case member 22. The case member 22 may be made of e.g. polycarbonate containing a coloring pigment. The circuit board 24, which is made of glass-fiber-reinforced epoxy resin, carries a plurality of light emitting diodes (LED) 25 in corresponding relation to the segmented display windows 21, and has a plurality of downwardly projecting leads 26. Each of the LEDs 25 has a lower electrode layer (not shown) bonded to a predetermined portion of the circuit pattern of the circuit board 24 in electrical conduction therewith. The LED 25 also has an upper electrode layer (not shown) electrically connected to another predetermined portion of the circuit pattern through a metal wire 27. The interior space of the case member 22 and the segmented display windows 21 are filled with a body 23 of transparent resin (mainly containing epoxy resin for example). The transparent resin body 23 may be defoamed before hardening thereof to prevent light deflection at the interfaces between the foams and the resin.

In use, the light emitting display device described above is mounted to a suitable portion of a mother circuit board (not shown) together with other electronic components (not shown). Most of the other electronic components is of the leadless surface mounting type due to the need for size reduction. Thus, the majority of the other electronic components may be mounted on the mother circuit board by reflow soldering, whereas the lead type light emitting display device need be mounted to the mother circuit board by manual soldering or dip-soldering in a separate process step. Further, the mother circuit board need be made to have through-holes for allowing insertion of the leads of the display device, and a subsequent process step is additionally required for cutting or bending the inserted leads.

It is conceivable, therefore, to modify the lead type light emitting display device into a leadless surface mounting type light emitting display device by replacing the leads with layer-like terminal electrodes. Such a modification leads to the following new problems when reflow soldering is performed for the display device.

First, since the case member 22, the circuit board 24 and the transparent resin body 23 are all made of different materials, they have different coefficients of linear expansion, which leads to thermal warping of the display device at the time of reflow soldering. More specifically, when the display device is mounted by reflow soldering, the display device is heated to a high temperature of about 250° C., as opposed to manual soldering or dip-soldering wherein the display device is heated only to a temperature of less than 100° C. Thus, there will be a significant difference in thermal expansion between the case member 22, the circuit board 24 and the transparent resin body 23 if these parts are firmly fixed together. As a result, the display device will warp due to the so-called "bimetal phenomenon" to be partially lifted off the mother circuit board, thereby causing improper electrical connection relative to the mother circuit board.

Secondly, since each of the LEDs 25 together with its associated wire 27 is completely enclosed within the transparent resin body 23 in direct contact therewith, the LED 25 and the wire 27 may be mechanically damaged (e.g. cutting or separation of the wire) due to thermal expansion of the transparent resin body 23.

The above-described problems become particularly remarkable if the size of the display device is enlarged to accommodate a large number of segmented display windows.

SUMMARY OF THE INVENTION

It is, therefore, an object of the present invention to provide a surface mounting type light emitting display device which can be conveniently mounted to a mother circuit board by reflow soldering while eliminating or reducing the above-described problems of the prior art.

Another object of the present invention is to provide a process for making such a display device.

A further object of the present invention is to provide a surface mounting structure incorporating such a display device.

According to a first aspect of the present invention, there is provided a surface mounting type light emitting display device comprising: a base plate formed with terminal electrodes at least along one edge thereof, the base plate carrying light emitting elements thereon; a case member for covering and accommodating the light emitting elements; and mounting means for attaching the case member to the base plate while allowing the case member and the base member to expand and contract independently of each other at least in one direction.

Preferably, the case member may have housing spaces each closed by a transparent window member for accommodating a respective one of the light emitting elements in an non-contacting state.

According to a preferred embodiment of the present invention, the mounting means comprises a central positioning pin provided on one of the case member and the base plate, and a central positioning hole formed on the other of the case member and the base plate for receiving the central positioning pin. In case where each of the case member and the base plate is elongate, the mounting means may further comprise a positioning end pin provided on one of the case member and the base plate at each end thereof, and an elongated positioning end hole provided on the other of the case member and the base plate at each end thereof for receiving the end positioning pin while allowing the case member to expand and contract relative to the base plate longitudinally thereof. Each of the central and end positioning holes may be a through-hole or a bottomed hole.

According to another preferred embodiment of the present invention, the mounting means comprises hook portions formed on one of the case member and the base plate for slidable engagement with the other of the case member and the base plate.

According to a further preferred embodiment of the present invention, the mounting means comprises separate fixing members for engaging both of the case member and the base plate while allowing relative expansion and contraction between the case member and the base plate in said one direction. In this case, each of the fixing members may be a channel member which is fitted at a stepped portion of each of the case member and the base plate so as not to project beyond upper and lower surfaces of the display device. Alternatively, each of the fixing members is an eyelet-like member which is fitted in a stepped through-hole of each of the case member and the base plate so as not to project beyond upper and lower surfaces of the display device.

The case member may be made of a heat-resistant resin to prevent or restrain the case member from thermally deforming at the time of reflow soldering for surface mounting. By contrast, the case member 22 of the prior art display device (see FIGS. 11a and 11b), which is made of polycarbonate (thermoplastic resin), starts thermally deforming at a temperature of 120–130° C. which is far below the reflow soldering temperature.

Further, in case where each of the case member and the base plate is elongate, the case member may be preferably made to have a larger coefficient of linear expansion in a longitudinal direction thereof than in a widthwise direction. For this purpose, the case member may be typically made of a liquid crystal polymer.

The transparent window member may be made of a resin having a glass transition point of no more than 70° C. Such a resin has been found to be rubberized when heated to a temperature of no less than about 100° C., so that the window member made of such a resin can be prevented from undergoing crack formation by rubberization at the time of reflow soldering. By contrast, the transparent resin body 23 of the prior art display device (FIGS. 11a and 11b) is known to have a high glass transition point of about 110–130° C., so that it is likely to undergo crack formation due to vitrification at the reflow soldering temperature.

According to a second aspect of the present invention, there is provided a process for making a surface mounting type light emitting display device comprising the steps of: preparing a base plate formed with terminal electrodes at least along one edge thereof; mounting light emitting elements on the base plate; preparing a case member which has housing spaces in corresponding relation to the light emitting elements of the base plate, each of the housing spaces being partially defined by a transparent window member; and mounting the case member to the base plate in a manner such that the case member and the base member are allowed to expand and contract independently of each other at least in one direction while each of the light emitting elements are accommodated in a corresponding housing space without coming into contact with walls thereof.

According to a third aspect of the present invention, there is provided a surface mounting structure for mounting a surface mounting type light emitting display device to a surface of a mother circuit board, the display device comprising a base plate formed with terminal electrodes at least along one edge thereof and carrying light emitting elements thereon, and a case member having hook portions projecting beyond a lower surface of the base plate for engagement therewith, wherein the mother circuit board having a hook receiving hole for receiving each of the hook portions of the case member, the terminal electrodes of the base plate being electrically connected to a circuit pattern formed on the surface of the mother circuit board.

Other objects, features and advantages of the present invention will become apparent from the following description of the preferred embodiments given with reference to the accompanying drawings.

BRIEF DESCRIPTION OF THE DRAWINGS

In the accompanying drawings:

FIG. 4 is a sectional view taken on lines IV—IV in FIG. 1a;

FIG. 8c is an enlarged fragmentary sectional view taken along lines VIIIc—VIIIc in FIG. 8a;

FIG. 11b is an enlarged fragmentary sectional view taken along lines XIb—XIb in FIG. 11a.

DETAILED DESCRIPTION OF THE PREFERRED EMBODIMENTS

FIGS. 1a through 1d of the accompanying drawings illustrate a light emitting display device according to a first embodiment of the present invention. The display device comprises a case member 1 which is rectangular in plan view, and a base plate 2 which is also rectangular in plan view. The base plate 2 has a length of 36 mm and a width of 20 mm. The case member 1, which is mounted on the base plate 1, is similarly sized though it is slightly narrower than the base plate 2. The case member 1 has an upper surface formed with a plurality of display segments 3 which may be in a figure eight pattern or otherwise patterned.

The case member 1 is made of a heat-resistant resin material which is rendered non-transparent by inclusion of a coloring additive. The heat-resistant resin material should preferably resist thermal deformation at 280° C. for no less than 10 seconds, as required for withstanding reflow soldering without thermal deformation. A liquid crystal polymer is a preferred example of such resin material because reinforcing glass fibers may be incorporated with a specific orientation at the time of molding, so that the molded body can be made to have a lower coefficient of linear expansion longitudinally of the glass fibers and a higher coefficient of linear expansion transversely of the glass fibers. In the present embodiment, the case member 1 is made of a glass-fiber-reinforced liquid crystal polymer, and the coefficient of linear expansion of the case member 1 is $2.6 \times 10^{-5}/°$ C. in the longitudinal direction and $1.3 \times 10^{-5}/°$ C. in the widthwise direction.

Figure 2:
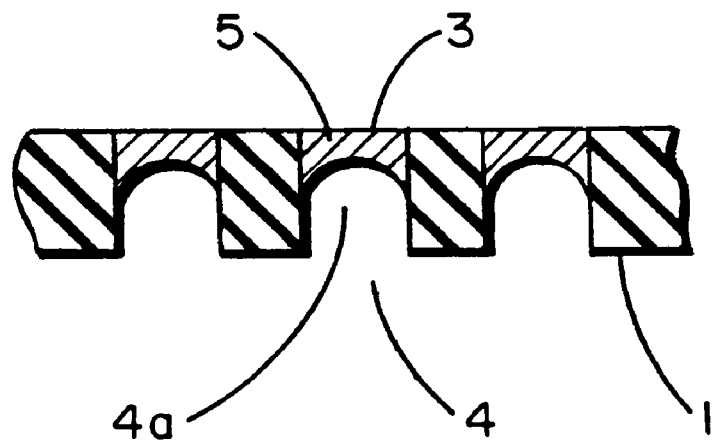
FIG. 2 is a longitudinal sectional view showing a case member of the same display device.

As shown in FIG. 2, each of the display segments 3 is formed by an opening 4 which is closed by a transparent window member 5 to provide a domed housing space 4a therebelow. The window member 5 may be formed by partially filling the opening 4 with a transparent resin material. An example of such resin material for the window member 5 is an epoxy resin. Preferably, the transparent resin material for the window member 5 should have a glass transition point (Tg) of no more than 70° C., particularly 40–60° C. It has been experimentally found that the window member 5 is very likely to undergo crack formation at the time of reflow soldering when the glass transition point Tg of the resin material is high, but the occurrence of such crack formation drastically lowers when the glass transition point Tg of the resin material drops to about 70° C. Further, such crack formation becomes substantially non-existent when the glass transition point Tg of the resin material is no more than 60° C.

Figure 3:
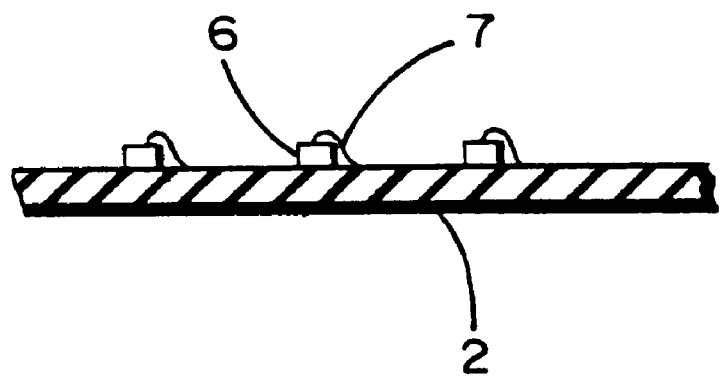
FIG. 3 is a longitudinal sectional view showing a base plate of the same display device.

The base plate 2 may be made of e.g. a glass-fiber-reinforced epoxy resin which is widely used as a material for printed circuit boards. In the present embodiment, the base plate 2 has a linear expansion coefficient of $1.1-1.2 \times 10^{-5}/$ °C. which is nearly equal to the widthwise linear expansion coefficient of the case member 1. The base plate 2 has an upper surface formed with a predetermined circuit pattern (not shown). As shown in FIG. 3, a plurality of LEDs 6 as light emitting elements are bonded on the base plate with their respective lower electrode connected to a corresponding bonding pad of the circuit pattern, whereas the upper electrode of each LED is connected to a corresponding wire bonding pad of the circuit pattern through a metal wire 7. The circuit pattern is connected to terminal electrodes 8 which formed along both longitudinal edges of the base plate 2 to extend from the upper to lower surfaces of the base plate 2 (see FIGS. 1a–1c) for enabling reliable soldering. In the illustrated embodiment, each longitudinal edge of the base plate 2 is formed with arcuate cutouts 8 at the terminal electrodes 8.

Figure 1A:
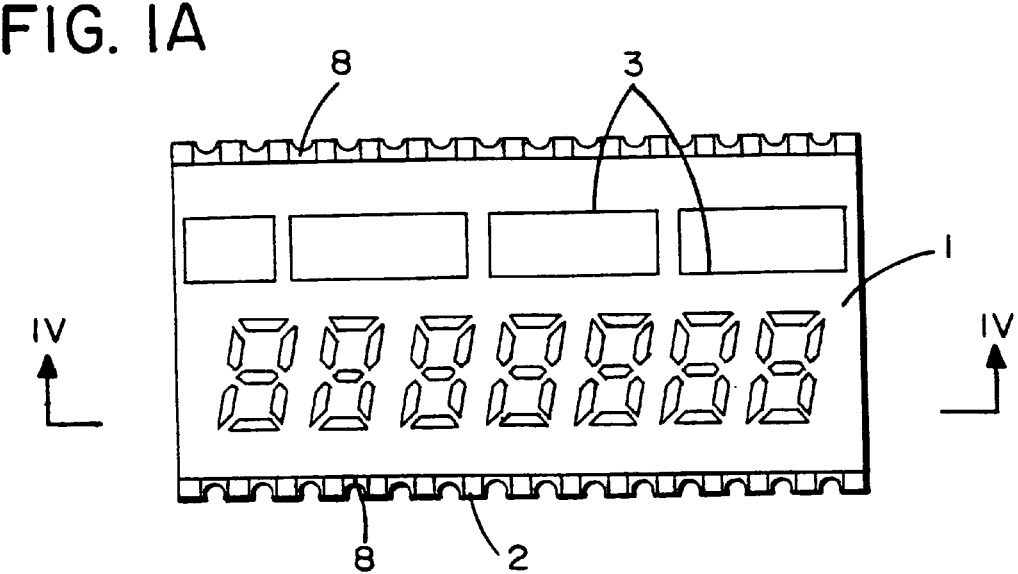
FIG. 1a is a plan view showing a surface mounting type light emitting display device according to a first embodiment of the present invention.
Figure 1B:
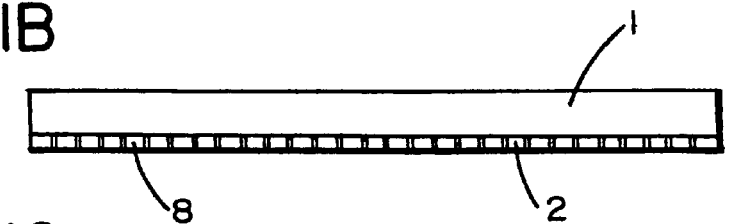
FIG. 1b is a front view of the same.
Figure 1C:
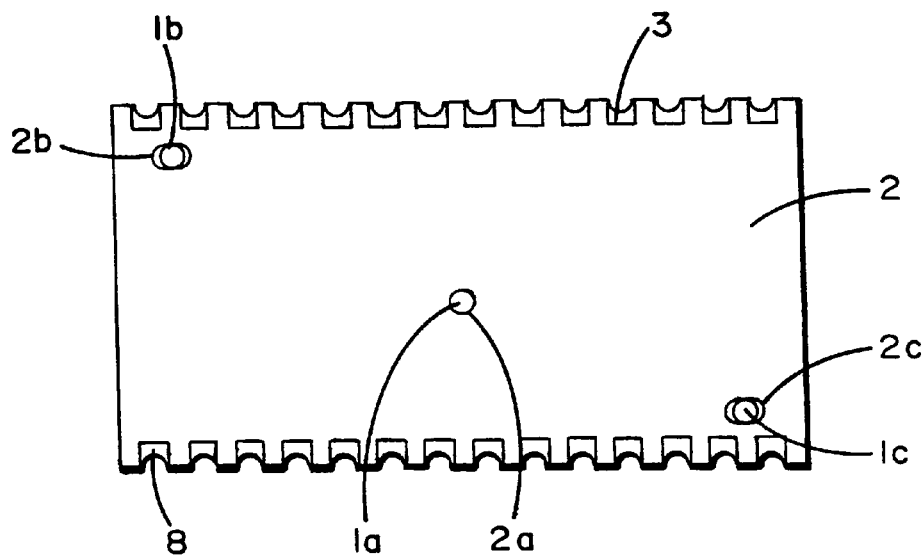
FIG. 1c is a bottom view of the same.
Figure 1D:
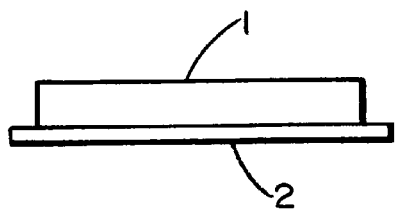
FIG. 1d is a side view of the same.

As shown in FIG. 1c, the underside of the case member 1 is provided with a central pin 1a and two end pins 1b, 1c. Similarly, the base plate 2 is formed with a central through-hole 2a and two end through-holes 2b, 2c for receiving the pins 1a–1c of the case member 1. The projecting height of the respective pins 1a–1c is such that they would be invisible (as viewed laterally) or project only slightly from the respective through-holes 2a–2c. The central pin 1a of the case member 1 may be press-fitted in the central through-hole 2a of the base plate 2 to fix the former relative to the latter. In the present embodiment, the two end pins 1b, 1c as well as the two end through-holes 2a are diagonally opposite to each other.

According to the present embodiment, the two end through-holes 2b, 2c of the base plate 2 are elongated longitudinally of the base plate 2 (and also longitudinally of the case member 1). As previously described, the case member 1 is nearly equal to the base plate 2 in linear expansion coefficient widthwise thereof but has a larger linear expansion coefficient longitudinally of the base plate 2. Thus, at the time of mounting the display device onto a mother circuit board (not shown), the case member 1 expands longitudinally by a greater extent than the base plate 2 while expanding widthwise by substantially the same extent as the base plate 2. However, since the elongated end through-holes 2b, 2c of the base plate 2 allow the end pins 1b, 1c (i.e., both ends of the case member 1) to slide longitudinally relative to the base plate 2, neither of the case member 1 and the base plate 2 will be stressed longitudinally in spite of a difference in longitudinal linear expansion. On the other hand, a difference in widthwise linear expansion between the case member 1 and the base plate 2, if any, is negligible, so that the end through-holes 2b, 2c need not be elongated in this direction.

Figure 4:
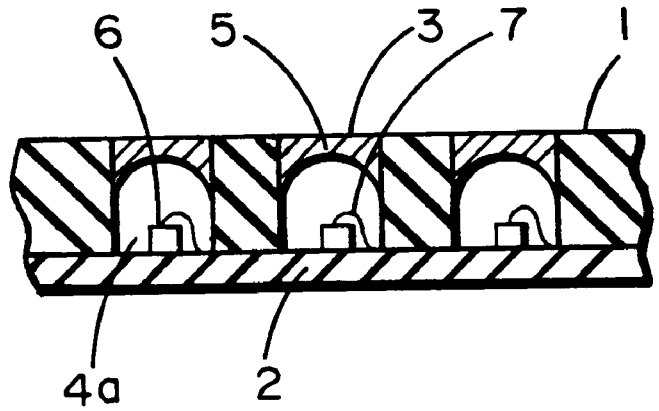

As shown in FIG. 4, the case member 1 is mounted on the base plate 2 in a manner such that each LED 6 together with its associated metal wire 7 is received in the housing space 4a of a corresponding display segment 3 without coming into contact with the window resin member 5 and the side walls of the housing space 4a. Preferably, the metal wire 7 should be oriented to extend longitudinally of the display segment to prevent the wire 7 from coming into contact with the window resin member 5 and the side walls of the housing space 4a even when the case member 1 and the base plate 2 expands by different degrees at the time of reflow soldering.

Each LED 6 may have a generally known structure which includes a GaAlAs substrate. Preferably, however, use may be made of an LED of the type which is disclosed in pending Japanese Patent Application No. 7-154494 (of the same assignee) and which incorporates a GaAlInP substrate for providing a sufficient luminance with a much smaller size. Specifically, given the same current, the latter LED (incorporating the GaAlInP substrate) is 4–5 times as bright as the conventional LED (incorporating the GaAlAs substrate) and therefore may be reduced in size to have a light emitting area which is generally equal to about ¼ the light emitting area of the conventional LED. As a result, the LED 6 together with its associated wire 7 can be prevented from touching the case member 1 with additional reliability while realizing a size reduction and finer display function of each display segment 3.

If necessary or preferred, the central pin 1a of the case member 1 may be adhesively fixed in the central through-hole 2a of the base plate 2 as long as the two end pins 1b, 1c are movable or slidable within the respective end through-holes 2b, 2c to allow independent longitudinal expansion and contraction of the case member 1 and the base plate 2. Further, the central pin 1a and the central through-hole 2a may be dispensed with, and one of the end pins 1b, 1c may be fixed within a corresponding one (not elongated) of the two end through-holes 2b, 2c, whereas the other end pin is allowed to move within the other end through-hole (elongated).

The display device having the above structure may be manufactured in the following manner.

First, a base plate 2 is prepared which has through-holes 2a–2c, a predetermined circuit pattern (not shown) and terminal electrodes 8.

Then, a plurality of LEDs 6 are mounted on the base plate 2 at suitable portions of the circuit pattern and electrically connected to different portion of the circuit pattern by a corresponding number of metal wires 7.

Then, a case member 1 is prepared which has a predetermined pattern of openings 4 (for display segments 3) and integral pins 1a–1c. Of course, the case member 1 may be prepared before or simultaneously with preparing the base plate 1.

Then, a sealing sheet or tape (not shown) is attached to the upper surface of the case member 1 to partially close each of the openings 4.

Then, the case member 1 is placed upside down, and a controlled amount of transparent resin material in liquid or gel form is loaded into each opening 4. The sealing tape or sheet is removed upon hardening of the resin material, and as a result, a transparent window member 3 is formed at the opening 4 to provide a domed housing space 4a. At this time, the resin material may be defoamed if necessary.

Finally, the case member 1 is mounted on the base plate 2 in a manner such that each domed housing space 4a receives a corresponding LED 6 and wire 7 without contact therewith. At this time, the combination of the pins 1a–1c with the through-holes 2a–2c serves to suitably position the case member 1 relative to the base plate 2.

Figure 5:
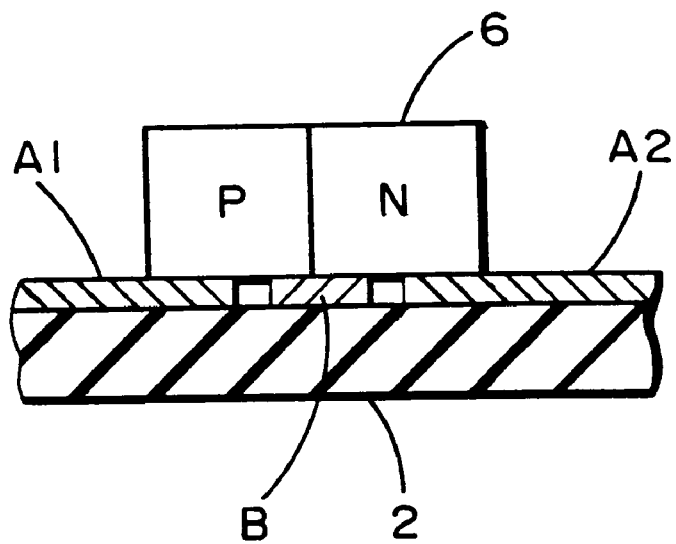
FIG. 5 is a sectional view showing a slight modification of the first embodiment.
Figure 6:
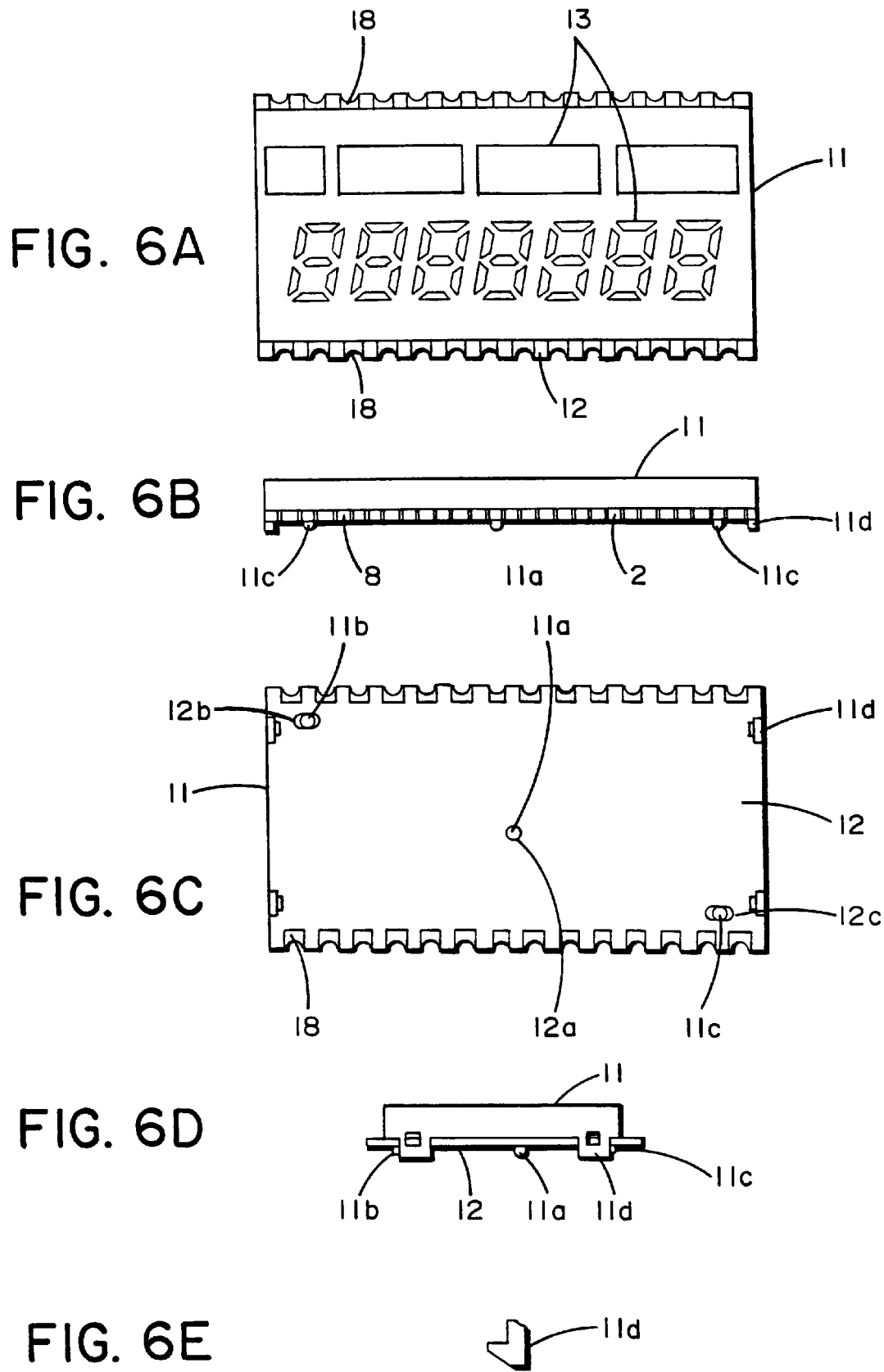
FIG. 6a is a plan view showing a surface mounting type light emitting display device according to a second embodiment of the present invention.
FIG. 6b is a front view of the second embodiment display device.
FIG. 6c is a bottom view of the second embodiment display device.
FIG. 6d is a side view of the second embodiment display device.
FIG. 6e is an enlarged view showing a hook portion of the second embodiment display device.

The first embodiment described above may be slightly modified, as shown in FIG. 5. Specifically, in this modification, each of LEDs 6' is bonded on a base plate 2' in a lying posture so that the P-layer of the LED 6' is held in contact with a positive pad portion A1 of the circuit pattern while the N-layer of the LED 6' is held in contact with a negative pad portion A2. Preferably, the LED 6' is bonded on the base plate 2' by means of an insulating adhesive layer.

According to the above-described modification, each LED 6' need not be connected to the circuit pattern by a metal wire. Thus, the thickness and weight of the display device can be correspondingly reduced.

FIGS. 6a through 6e illustrate a light emitting display device according to a second embodiment of the present invention. The display device of this embodiment is basically similar to that of the first embodiment. Like the first embodiment, the display device of the second embodiment comprises a case member 11 and a base plate 12. The case member 11 is provided with a plurality of display segments 13, and a plurality of downwardly projecting pins 11a–11c. Further, the base plate 12 has a plurality of terminal electrodes 18, and a plurality of through-holes 12a–12c for receiving the pins 11a–11c of the case member 11. However, the second embodiment differs from the first embodiment in the following respects.

First, each end of the case member 11 is integrally formed with downwardly projecting hook portions 11d for slidable engagement with the underside of the base plate 12 at each end thereof. Thus, the hook portions 11d allow the case member 11 to expand independently of the base plate 12 at the time of reflow soldering while holding these two components together. Further, the provision of the hook portions 11d makes it unnecessary to press-fit or adhesively fix the central pin 11a of the case member 11 within the central through-hole 12a of the base plate 12.

Secondly, the pins 11a–11c of the case member 11 are made longer to project out of the respective through-holes 12a–12c of the base plate 12. Preferably, however, the pins 11a–11c should not project more than the hook portions 11d project beyond the underside of the base plate 12.

Figure 7:
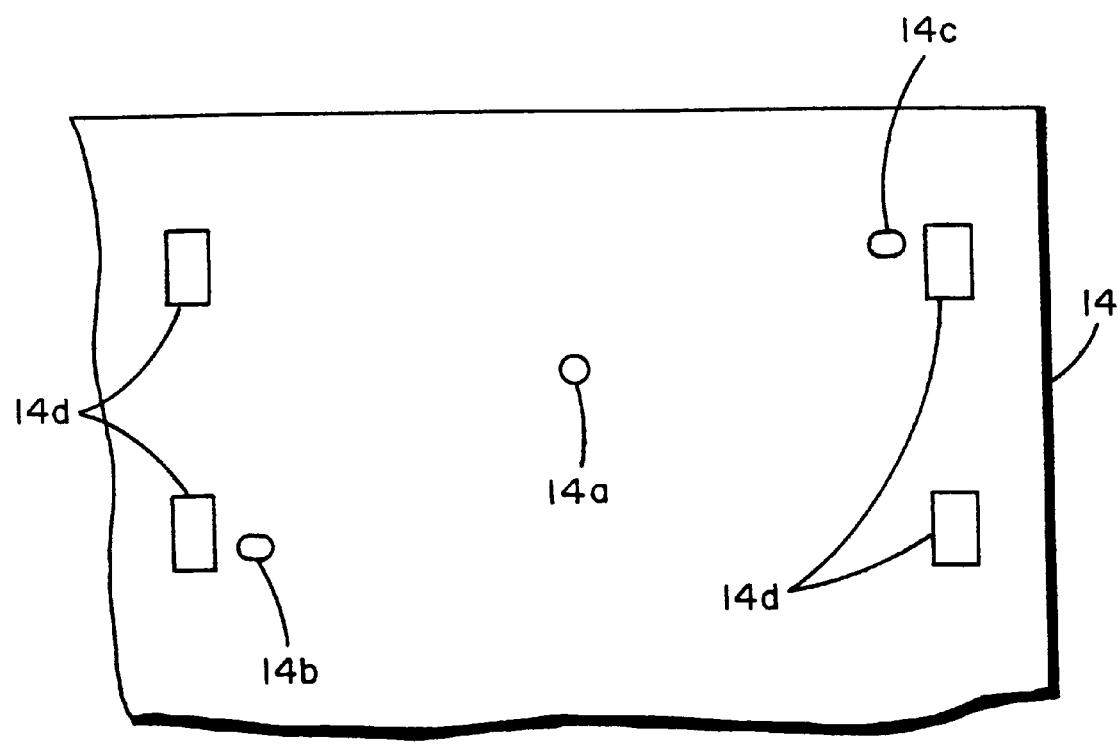
FIG. 7 is a front view showing a mother circuit board to which the second embodiment display device may be conveniently mounted.

The display device of the second embodiment described above may be conveniently mounted to such a mother circuit board as shown in FIG. 7. Specifically, the mother circuit board represented by reference numeral 14 is formed with a plurality of pin receiving through-holes 14a–14c in corresponding relation to the pins 11a–11c of the case member 11, and a plurality of rectangular hook receiving through-holes 14d in corresponding relation to the hook portions 11d. The use of the thus configured mother circuit board 14 allows surface-to-surface contact between the mother circuit board 14 and the display device despite the presence of the downwardly projecting pins 11a–11c and hook portions 11d, thereby facilitating reflow soldering of the display device relative to the mother circuit board 14. It should be appreciated that the through-holes 14a–14d of the mother circuit board 14 may be wholly or partially replaced by bottomed holes depending on the thickness of the mother circuit board 14 and/or the projecting length of the pins 11a–11c and hooks 11d.

According to each of the first and second embodiments, the case member 1, 11 is formed with pins 1a–1c, 11a–11c, whereas the base plate 2, 12 is formed with through-holes 2a–2c, 12a–12c. Alternatively, the base plate 2, 12 may be formed with pins, whereas the case member 1, 11 may be formed with corresponding through-holes or bottomed holes for receiving the pins. Further, the second embodiment may be modified so that the base plate 12 is integrally formed with upwardly projecting hook portions for slidable engagement with the upper surface of the case member 11.

FIGS. 8a through 8d illustrate a light emitting display device according to a third embodiment of the present invention. Again, the display device of this embodiment is basically similar to that of the first embodiment. Like the first embodiment, the display device of the third embodiment comprises a case member 111 and a base plate 112. The case member 111 is provided with a plurality of display segments 113, and a plurality of downwardly projecting pins 111a–111c. Further, the base plate 112 has a plurality of terminal electrodes 118, and a plurality of through-holes 112a–112c for receiving the pins 111a–111c of the case member 111. However, the third embodiment differs from the first embodiment in the following respects.

Specifically, each end of the case member 111 is formed, at its widthwise center, with a rectangular stepped portion 111e which, in turn is formed with two fixing through-holes 111f. Similarly, each end of the base plate 112 is formed, at its widthwise center, with a rectangular stepped portion 112e which, in turn is formed with two fixing through-holes 112f.

The stepped portions 111e and fixing through-holes 111f of the case member 111 as well as the stepped portions 112e and fixing through-holes 112f of the base plate 112 are utilized for attaching a fixing member 115 at each end of the display device. The fixing member 115, which is a channel member made of a metal such as iron, comprises a web portion 115a, an opposite pair of arm portions 115b extending substantially perpendicularly from the web portion 115a, and an opposite pair of hook portions 115c extending substantially perpendicularly from the arm portions 115a. In the illustrated example, each of the hook portions 115c is bifurcated.

In assembly, the case member 111 are placed on the base plate 112 so that the display segments 3, pins 111a–111c, stepped portions 111e and fixing through-holes 111f of the case member 111 positionally correspond to the LEDs (not shown), pin receiving through-holes 112a–112c, stepped portions 112e and fixing through-holes 112f, respectively, of the base member 112. In this condition, the hook member 115 is attached to the stepped portions 111e, 112e at each end of the display device by elastically opening the arm portions 115b and the hook portions 115c. As a result, the bifurcated hook segments 115c are received in the fixing through-holes 111f, 112f of the case member 111 and base plate 112, thereby holding the case member 111 and the base plate 112 together while preventing hook member 115 from unexpectedly coming off these two components.

Figure 8A:
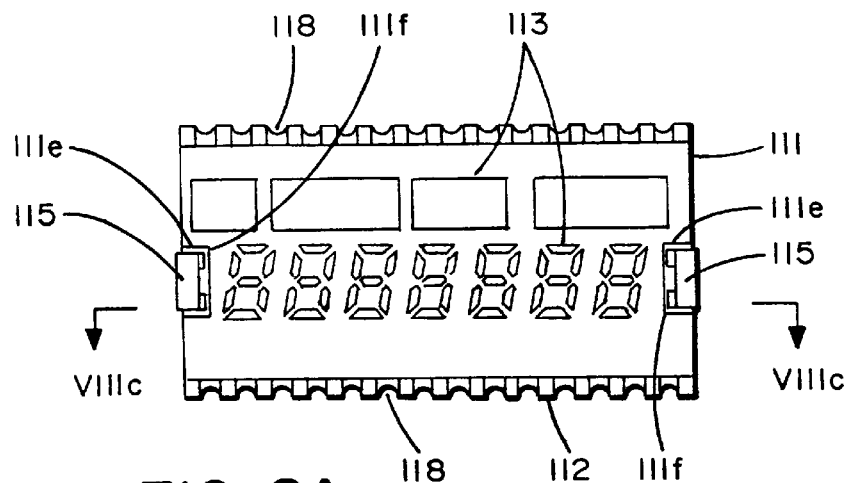
FIG. 8a is a plan view showing a surface mounting type light emitting display device according to a third embodiment of the present invention.
Figure 8B:
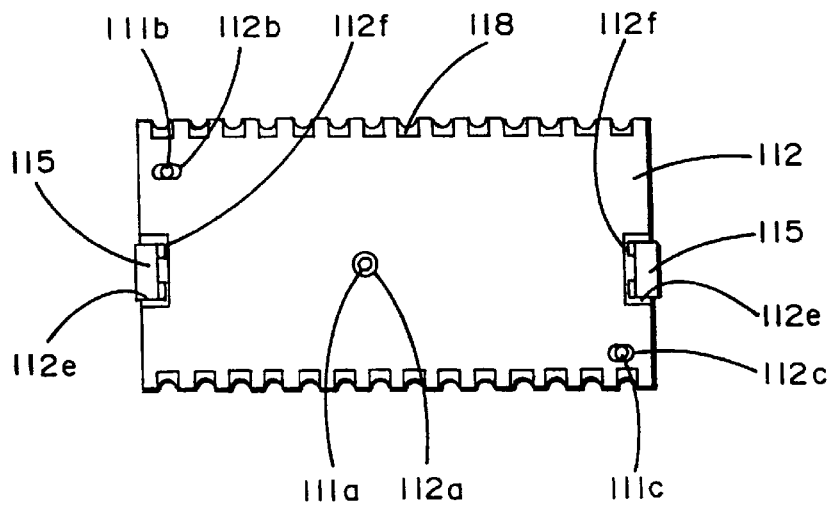
FIG. 8b is a bottom view of the third embodiment display device.
Figure 8C:
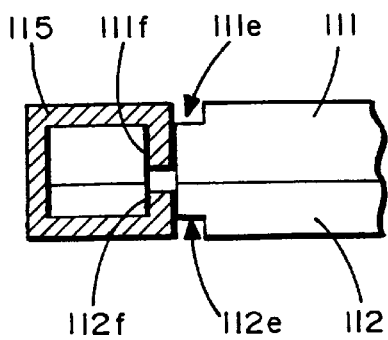
Figure 8D:
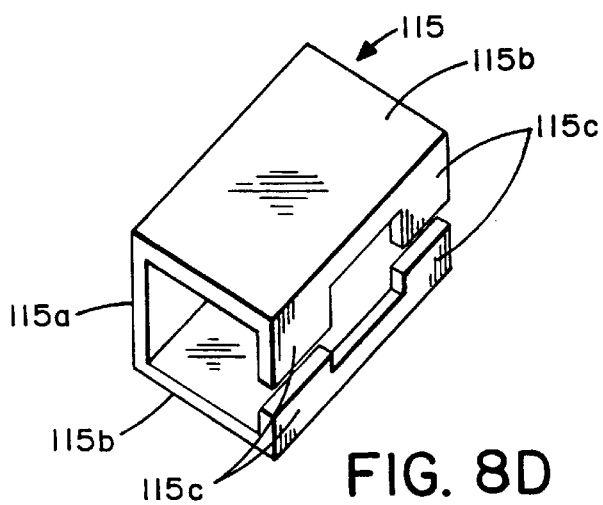
FIG. 8d is a perspective view showing a fixing member incorporated in the third embodiment display device.

As shown in FIG. 8c, each fixing through-hole 111f, 112f of the case member 111 and base plate 112 has a width which is slightly greater than the thickness of each hook portion 115c of the fixing member 115, thereby allowing the case member 111 to longitudinally expand independently of the base plate 112 to prevent warping of the display device at the time of reflow soldering. Further, the web portion 115a of the fixing member 115 may be preferably spaced slightly from the corresponding end faces of the case member 111 and base plate 112 for additionally facilitating independent longitudinal expansion of the case member 111 and base plate 112.

Further, the spacing between the two arm portions 115b of the fixing member 115 may be selected not to exert any elastic compressive force onto the case member 111 and the base plate 112.

Alternatively, the fixing member 115 may be designed to exert an elastic compressive force against the case member 111 and the base plate 112 as long as such a compressive force does not hinder these two components from longitudinally expanding independently of each other.

Further, it is advantageous if the arm portions 115b of the fixing member 115 are designed not to project upwardly and downwardly from the upper surface of the case member 111 and the lower surface of the base plate 112, respectively. Such a design makes it possible to reduce the thickness of the display device while facilitating to stably mount the mother circuit board (which carries the display device) within an electrical equipment such as portable telecommunication apparatus or audio-visual apparatus without any need for performing a special treatment of the machine frame. Particularly, when the lower arm portion 115b of the fixing member 115 is designed not to project downwardly from the lower surface of the base plate 112, the display device can be conveniently mounted to the mother circuit board while facilitating electrical connection of the terminal electrodes 118 to the circuit pattern of the mother circuit board by soldering.

Figure 9A:
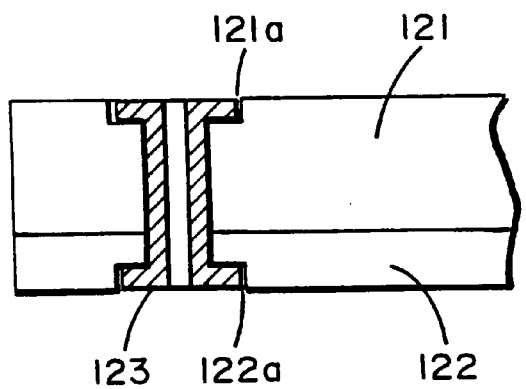
FIG. 9a is an enlarged front view, partially in section, showing a surface mounting type light emitting display device according to a fourth embodiment of the present invention.
Figure 9B:
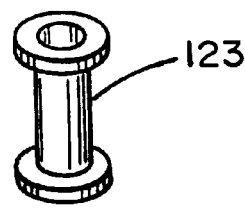
FIG. 9b is a perspective view showing an eyelet-like fixing member incorporated in the fourth embodiment display device.

FIGS. 9a and 9b illustrate only a principal portion of a light emitting display device according to a fourth embodiment of the present invention. The display device of this embodiment is basically similar to that of the third embodiment but differs therefrom only in the following points.

A case member represented by reference numeral 121 is formed, at each end thereof, with a stepped fixing through-hole 121a. Similarly, a base plate designated by reference numeral 122 is also formed, at each end thereof, with a stepped fixing through-hole 122a in alignment with the fixing through-hole 121a of the case member 121. An eyelet-like fixing member 123 is inserted in the respective fixing through-holes 121a, 122a and anchored in place by enlarging both ends of the fixing member 123 through plastic deformation (by crimping for example). Like the third embodiment, the enlarged ends of the fixing member 123 should be preferably made not to project beyond the upper surface of the case member 121 and the lower surface of the base plate 122, so that the respective fixing through-holes 121a, 122a are stepped for this purpose.

Figure 10A:
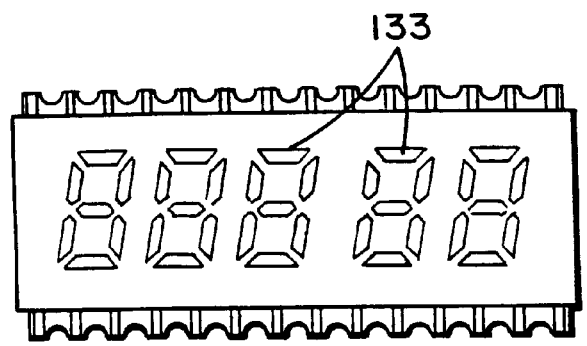
FIG. 10a is a plan view showing a modified arrangement of display segments.
Figure 10B:
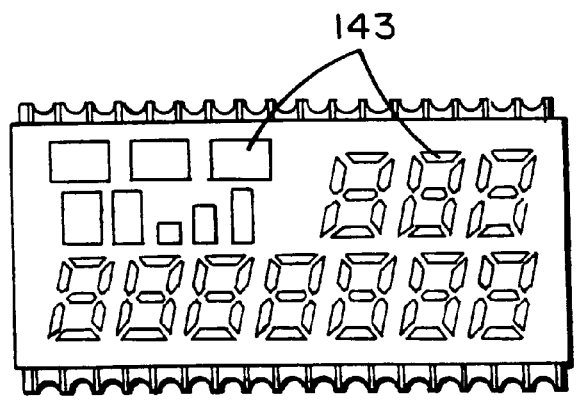
FIG. 10b is a plan view showing another modified arrangement of display segments.
Figure 11A:
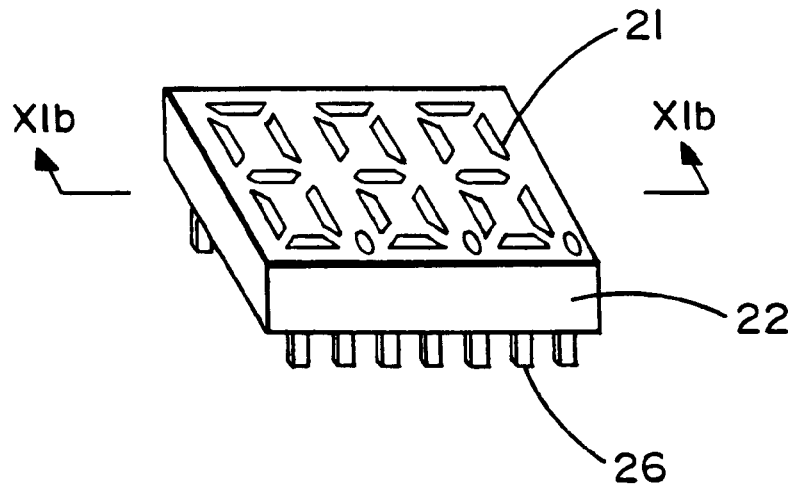
FIG. 11a is a perspective view showing a prior art light emitting display device.
Figure 11B:
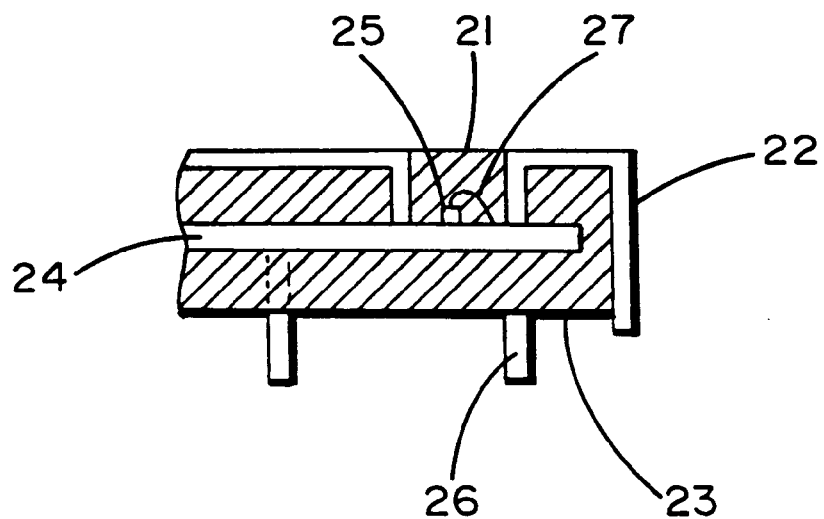

According to the present invention, the arrangement or pattern of the display segments may be variously modified. FIG. 10a shows a modified pattern of display segments 133, whereas FIG. 10b shows another modified pattern of display segments 143.

The present invention being thus described, it is obvious that the same may be varied in many ways. For instance, the fixing member 115 or 123 may be replaced by a differently configured fixing member as long as its allows relative expansion and contraction between the case member and the base plate. Such variations are not to be regarded as a departure from the spirit and scope of the invention, and all such variations as would be obvious to those skilled in the art are intended to be included within the scope of the following claims.

I claim:

1. A surface mounting type light emitting display device comprising;
   a base plate formed with terminal electrodes at least along one edge thereof, the base plate carrying light emitting elements thereon;
   a case member for covering and accommodating the light emitting elements; and
   mounting means for attaching the case member directly on the base plate while allowing the case member and the base member to expand and contract independently of each other at least in one direction;
   wherein the case member has housing spaces each closed by a transparent window member for accommodating a respective one of the light emitting elements in an non-contracting state.

2. The display device according to claim 1, wherein the mounting means comprises a central positioning pin provided on one of the case member and the base plate, and a central positioning hole formed on the other of the case member and the base plate for receiving the central positioning pin.

3. The display device according to claim 2, wherein each of the case member and the base plate is elongate, the mounting means further comprising a positioning end pin provided on one of the case member and the base plate at each end thereof, and a positioning end hole provided on the other of the case member and the base plate at each end thereof for receiving the end positioning pin, the positioning end hole being elongated longitudinally of the case member and the base plate for allowing relative movement of the end positioning pin.

4. The display device according to claim 1, wherein the mounting means comprises hook portions formed on one of the case member and the base plate for slidable engagement with the other of the case member and the base plate.

5. The display device according to claim 1, wherein the mounting means comprises separate fixing members for engaging both of the case member and the base plate while allowing relative expansion and contraction between the case member and the base plate in said one direction.

6. The display device according to claim 5, wherein each of the fixing members is a channel member which is fitted at a stepped portion of each of the case member and the base plate so as not to project beyond upper and lower surfaces of the display device.

7. The display device according to claim 5, wherein each of the fixing members is an eyelet-like member which is fitted in a stepped through-hole of each of the case member and the base plate so as not to project beyond upper and lower surfaces of the display device.

8. The display device according to claim 1, wherein the case member is made of a heat-resistant resin.

9. The display device according to claim 8, wherein each of the case member and the base plate is elongate, the case member having a larger coefficient of linear expansion in a longitudinal direction thereof than in a widthwise direction.

10. The display device according to claim 9, wherein the case member is made of a liquid crystal polymer.

11. The display device according to claim
    wherein the transparent window member is made of a resin having a glass transition point of no more than 70° C.

12. A process for making a surface mounting type light emitting display device comprising the steps of:
    preparing a base plate formed with terminal electrodes at least along one edge thereof;
    mounting light emitting elements on the base plate;
    preparing a case member which has housing spaces in corresponding relation to the light emitting elements of the base plate, each of the housing spaces being partially defined by a transparent window member; and
    mounting the case member directly on the base plate in a manner such that the case member and the base member are allowed to expand and contract independently of each other at least in one direction while each of the light emitting elements are accommodated in a corresponding housing space without coming into contact with walls thereof.

13. A surface mounting type light emitting display device comprising;
    a base plate formed with terminal electrodes at least along one edge thereof, the base plate carrying light emitting elements thereon;
    a case member mounted directly on the base plate for covering and accommodating the light emitting elements;
    non-loose positioning means for positionally fixing an intermediate portion of the case member relative to the base plate; and
    loose positioning means for allowing an end portion of the case member to slightly move relative to the base plate at least in one direction.

14. A surface mounting type light emitting display device comprising:
    a base plate formed with terminal electrodes at least along one edge thereof, the base plate carrying light emitting elements thereon;
    a case member for covering and accommodating the light emitting elements; and
    mounting means for attaching the case member directly on the base plate while allowing the case member and the base member to expand and contract independently of each other at least in one direction;
    wherein the mounting means comprises a central positioning pin provided on one of the case member and the base plate, and a central positioning hole formed on the other of the case member and the base plate for receiving the central positioning pin.

15. A surface mounting type light emitting display device comprising:
    a base plate formed with terminal electrodes at least along one edge thereof, the base plate carrying light emitting elements thereon;
    a case member for covering and accommodating the light emitting elements; and
    mounting means for attaching the case member directly on the base plate while allowing the case member and the base member to expand and contract independently of each other at least in one direction;
    wherein the mounting means comprises hook portions formed on one of the case member and the base plate for slidable engagement with the other of the case member and the base plate.

* * * * *